Nov. 25, 1952 C. W. HAYES ET AL 2,619,187
GAS AND LIQUID SEPARATING APPARATUS
Filed Dec. 11, 1950 2 SHEETS—SHEET 2
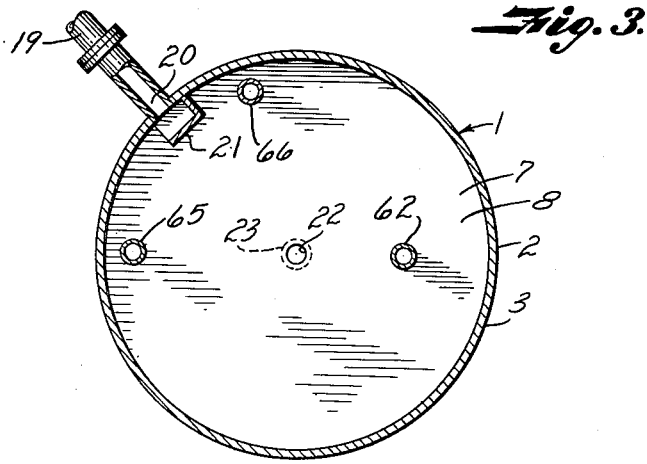
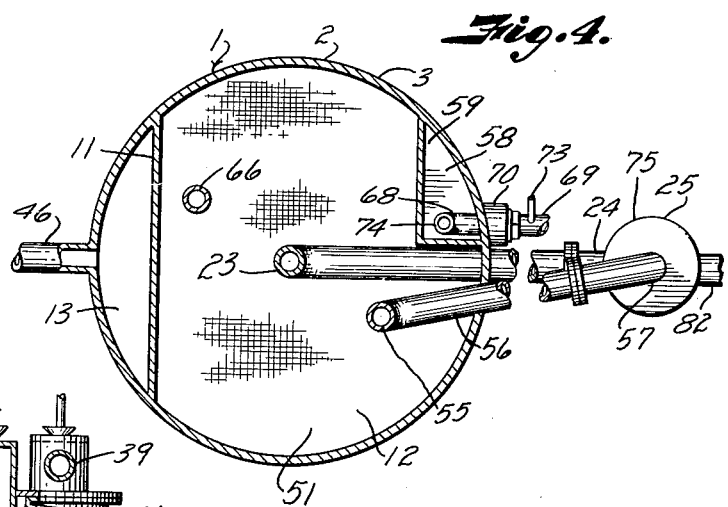
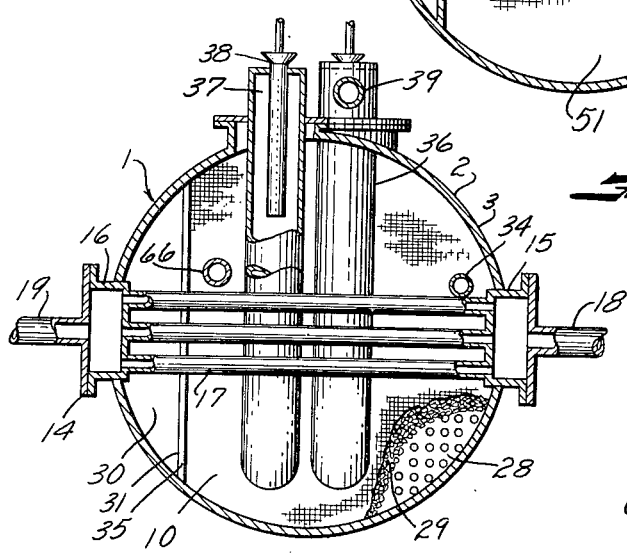
INVENTORS.
Charles W. Hayes and
BY Vernon G. Martin
Fishburn & Mullendore
ATTORNEYS Patented Nov. 25, 1952

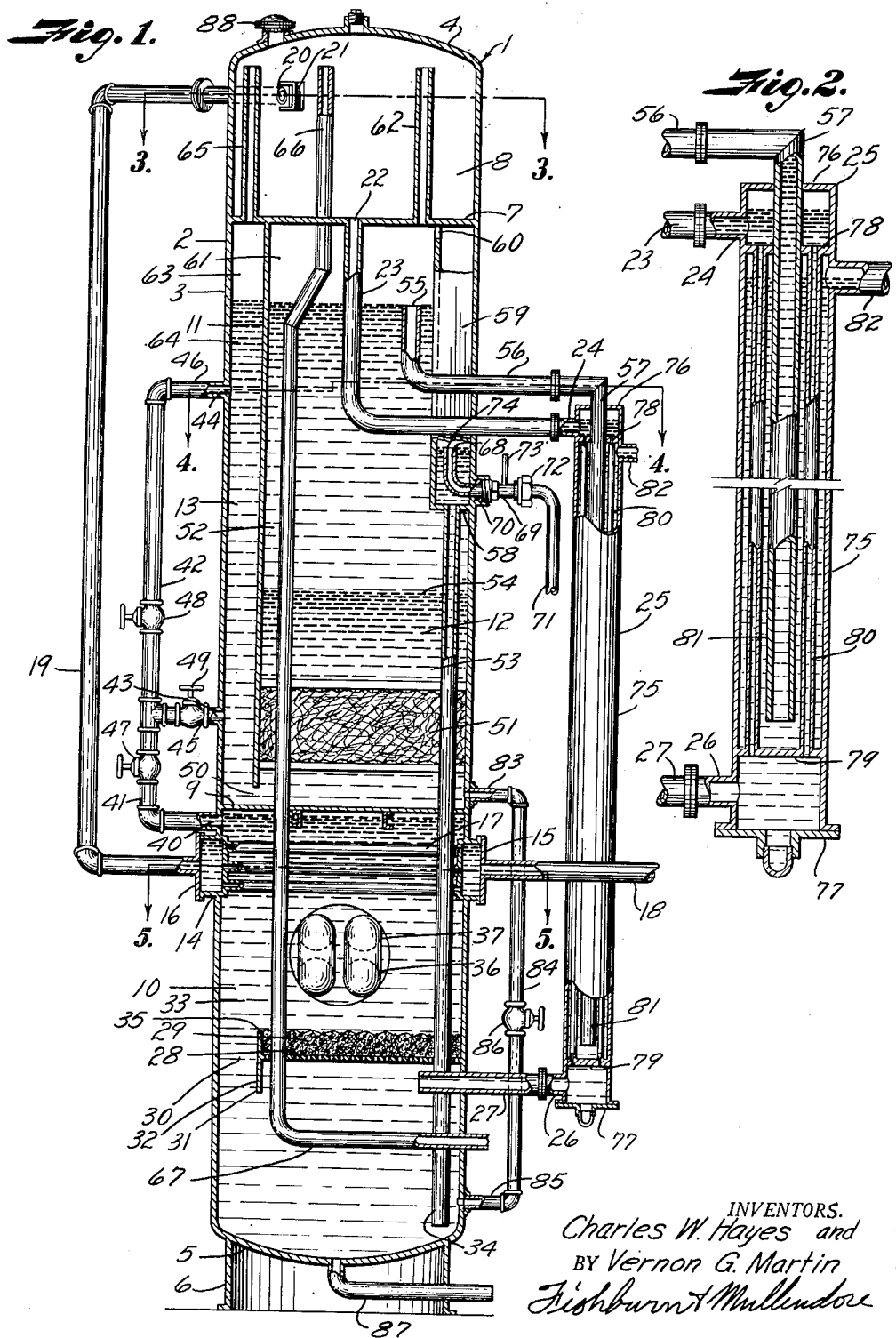

2,619,187

UNITED STATES PATENT OFFICE 2,619,187

GAS AND LIQUID SEPARATING APPARATUS

Charles W. Hayes, Johnson County, Kans., and Vernon G. Martin, Independence, Mo., assignors to Black, Sivalls & Bryson, Inc., Kansas City, Mo., a corporation of Delaware Application December 11, 1950, Serial No. 200,268

6 Claims. (Cl. 183—2.7)

This invention relates to an apparatus for treating fluid mixtures such as the flow from a petroleum producing well. The flow from such wells usually contains free water, oil and gas, together with an oil and water emulsion and requires separation of the respective components and treatment of the emulsion to free the oil and settling out of the water.

It is therefore the principal object of the present invention to provide a simple and efficient apparatus for separating the components in a well flow and obtain substantially stable oil and gas products at the operating temperature of the apparatus.

Other objects of the invention are to provide a flow treating apparatus with separate heating and settling sections and a separate intermediate section or flume for handling any gases evolved in the heating section so as to avoid turbulence in the settling section and to control temperature of the liquids admitted therein; to provide a flow treating apparatus which is constructed for use in cold climates without danger of freeze-ups; and to provide a readily adjustable water siphon for drawing off the separated water.

In accomplishing these and other objects of the invention hereinafter pointed out, we have provided improved structure, the preferred form of which is illustrated in the accompanying drawings wherein:

Fig. 1 is a vertical section through a treating apparatus constructed in accordance with the present invention.

Fig. 2 is an enlarged vertical section through the heat exchanger by which the separated emulsion is caused to take heat of the oil product and the oil product is cooled.

Fig. 3 is a horizontal section through the surge chamber or gas separating section of the apparatus taken on the line 3—3 of Fig. 1.

Fig. 4 is a horizontal section through the settling section of the apparatus on the line 4—4 of Fig. 1.

Fig. 5 is a horizontal section through the heating section of the apparatus taken on the line 5—5 of Fig. 1.

Referring more in detail to the drawings:

1 designates a treating apparatus constructed in accordance with the present invention and which includes a substantially elongated vessel or tank 2 having a cylindrical side wall 3 closed at the upper and lower ends by heads 4 and 5. The vessel is supported in vertical position on a base 6 welded or otherwise attached to the bottom head 5. Extending transversely within the vessel and spaced below the head 4 is a transverse partition 7 which cooperates with the wall of the vessel and head 4 to form a surge chamber or gas separating compartment 8. Also extending transversely within the vessel intermediate the partition 7 and lower head 5 is a similar partition 9. The partition 9 cooperates with wall 3 and with the lower head 5 in forming a heating compartment 10. The portion of the vessel intermediate the partitions 7 and 9 is divided by a vertical partition 11, located adjacent the side wall of the vessel, into a settling compartment 12 and an evolved gas disposal and condensing flume 13.

Extending diametrically across the heating compartment 10 and in close proximity to the partition 9 is a heater 14 having headers 15 and 16 carried by the side wall of the vessel and interconnected by tubes 17. A fluid mixture to be separated and treated is delivered into the header 15 of the heater through a duct 18 and the other header 16 connects through a pipe 19 with an inlet port 20 located in the wall 3 at the upper portion of the gas separating compartment 8. The flow from the inlet port is preferably baffled and caused to travel circumferentially about the inner wall of the compartment 8 by means of a guard 21 to promote separation of the free gas from the liquids. The liquids remain in contact with the wall of the vessel and gravitate to the partition 7 from where they flow through a port 22 into a pipe 23 that extends downwardly from the partition 7 and then outwardly through the wall 3 to connect with an inlet 24 of a heat exchanger 25. The heat exchanger 25 is arranged vertically along the outer side of the vessel and has an outlet 26 at its lower end. Connected with the outlet 26 is a duct 27 that extends through the wall of the vessel and discharges into the heating compartment at a substantial distance above the lower head 5 to give ample space therebelow for dropping out any free water to the relatively cool lower portion of the compartment 10. The duct 27 preferably discharges under a perforated baffle or distributing plate 28 which carries on its upper face a filter bed 29. The baffle 28 connects with the wall 3 of the vessel but has one edge spaced therefrom at a point opposite the inlet duct 27 to provide a vertical passageway 30 that is formed by a relatively short vertical partition 31 having its ends connected with the opposite sides of the vessel. The partition has a depending lower edge 32 to cooperate with the baffle in forming a trap whereby the oil and emulsion components of the influent are caused to spread over the underside of the plate and pass upwardly through the perforations, through the filter bed, and through a body of heated water 33. Any free water contained with the influent, being of heavier specific gravity, descends to the lower portion of the compartment for draw-off through a pipe 34, later described. The upper edge of the partition 31 extends to the level of the filter bed to retain the filtering material as indicated at 35.

The body of water 33 is heated by a heater 36 that extends within the heating compartment between the filter bed 29 and the heater 14. The heater 36 may comprise a pair of U-shaped combustion chambers 37, each having one of their legs equipped with a gas or like burner 38. The other legs of the heater are connected with a vertical stack 39 through which products of combustion are discharged.

After passing through the heated water, any component of the fluid that has not settled out, is discharged through an opening 40 located in the wall 3 at a point slightly below the partition 9 and which connects with a transfer duct 41 having an upwardly extending manifold portion 42 which connects with vertically spaced ports 43 and 44 by branch ducts 45 and 46. Connected in the manifold portion of the duct 41 on the respective sides of the branch duct 45 are control valves 47 and 48 and connected in the branch duct 45 is a control valve 49. The valve 47 controls the rate of flow of liquids from the heating chamber and the valves 48 and 49 control flow through the ports 43 and 44 into the vertical flume 13. The partition 11 terminates short of the transverse partition 9 to form a bottom outlet 50 under a filter section 51. The filter section extends transversely of the settling compartment and assists in quieting the in-flow and promotes separation of the water and oil components of the emulsion.

The remaining water settles downwardly within the settling chamber and the oil has ample time to rise upwardly and collect in a body on the settled body of water as indicated by the numerals 52 and 53, the interface being indicated 54. The body of oil 52 accumulates in the settling compartment up to the inlet 55 of a discharge pipe 56 whereby the warm oil is discharged through the wall of the vessel and carried to inlet connection 57 of the heat exchanger 25.

The water discharge pipe 34, previously mentioned, extends upwardly within vessel through the baffle plate 28 and partition 9 to connect with the lower end 58 of a water collecting box 59 that is carried on the inner side of the vessel at the upper portion of the settling compartment. The box terminates short of the partition 7 to provide a pressure equalizing port 60 which connects with the gas space 61 above the body of collected oil. The space 61 is also connected with the gas separating compartment 8 by means of a pressure equalizing pipe 62. The space 63 above the level of the body of liquid 64 which collects within the flume 13 is connected with a pipe 65 that extends upwardly within the compartment 8 so that any uncondensed gases which were evolved from the heating of the liquids escape into the gas separating space for mixture with the relatively cooler separated gas.

The gas product is discharged through a pipe 66 that extends downwardly through the partitions 7 and 9, baffle plate 28 and which terminates in a lateral portion 67 extending through the side wall of the vessel. The free water collecting in the box 59 is discharged through a draw-off pipe 68 having a laterally extending portion 69 which is swivelly mounted in a packing box 70 carried by the side wall of the vessel and which is connected through a swivel 72 with a discharge pipe 71. The portion 69 of the discharge pipe carries a lever 73 by which the pipe may be rotated to change the height of the inlet 74 of the pipe 68.

The heat exchanger 25 may be of any suitable type but is shown as including an outer cylindrical shell 75 closed at the ends by heads 76 and 77. Spaced inwardly from the heads 76 and 77 are partitions 78 and 79 which are interconnected by a plurality of tubes 80 through which the liquids from the gas separating compartment are caused to flow on their way to the heating compartment. The oil discharge connection 57 includes a depending pipe 81 that extends downwardly to a point adjacent the lower partition 79 where the oil discharges and travels upwardly around the tubes 80 for return to the upper end of the heater where the cooled oil is carried away through a pipe 82. The excess water collecting in the bottom of the settling compartment is discharged through a port 83 into a connecting pipe 84 which extends downwardly and connects with a port 85 that is located in the wall of the vessel at a point slightly above the lower head 5. The flow of water from the settling compartment may be shut off by a valve 86 to prevent loss of the liquids from the settling chamber when it becomes necessary to drain the heating chamber for repairs. The valve 48 in the pipe 41 must also be closed when the valve 86 is closed; otherwise, the fluid will drain from the settling compartment by way of the port 40. The treating vessel may be supplied with various fittings such as a bottom drain 87 and a safety pressure device 88 mounted in the head 4.

In using the apparatus for treating flow from a petroleum producing well, the duct 18 is connected with the flow tubing of a well, the pipes 82 and 66 with oil and gas collecting pipe lines, and water discharge pipe 71 is connected with a suitable source of water disposal. The burners of the gas heater may be supplied with a portion of the separated gas or they may be connected with a suitable source of gas supply.

Assuming that the treater is in operation with a body of water substantially filling the heating compartment and that the settling compartment contains superimposed bodies of water and oil, the operation is as follows.

The flow from the well is preheated on passing through the tubes 17 by taking up heat of the liquid in the heating compartment, which heat is initially attained from that generated by the heater 36. Preheating of the well flow facilitates separation of the components thereof which are discharged through the pipe 19 and port 20 into the gas separating compartment where the fluids are caused to swirl about the wall of the vessel to separate the gas which accumulates in the upper portion thereof and is discharged through the pipe 66. The liquids being rid of the free gas, pass downwardly and flow over the partition 7 to the port 22 where they are discharged through the pipe 23 and through the heat exchanger 25 in heat exchange relation with the oil being discharged through the pipe 56. The preheated oil passes through the outlet connection 26 at the lower end of the preheater and is discharged through the duct 27 under the perforated baffle 28. The liquids on entering the space under the perforated baffle have sufficient heat so that the free water readily settles out of the heat zone to the bottom of the vessel, while the oil and oil emulsion pass upwardly in small streams through the perforated baffle 28, filter bed 29, and through the heated liquid which surrounds the heater, the heat being supplied in sufficient amount to break the emulsion. The water of the emulsion circulates downwardly through the passageway 30 to the bottom of the heating compartment where it is carried off with the free water through the pipe 34, the water rising upwardly through the pipe 34 into the collecting box 59 where it flows out through the inlet 74 of the pipe 68. Any remaining water and oil approaching the partition 9 pass through the outlet 40 and duct 41 for discharge into the flume 13 along with any gas evolved by heat in the heating compartment. The liquids may be discharged into the flume through either or both of the ports 43 and 44 by setting of the valves 48 and 49. The rate of flow is controlled by means of the valve 47.

When the fluids are discharged into the flume through the upper port 44, the evolved gases being nearer the level of the liquid in the flume quickly find their escape into the space 63 and pipe 65 into the upper portion of the gas separating compartment while the oil and any water gravitate downwardly through the flume and are cooled by the liquid passing in contact with the wall of the vessel. If the liquids are admitted through the lower port 43, the gases have a longer distance to travel upward through the body of liquid but the liquids retain more heat when they pass into the settling compartment.

It is thus obvious that the temperature of the oil in the settling compartment may be regulated by controlling the flow through the flume. The evolved gas which escapes from the flume is discharged into the relatively cool separated gas in the upper portion of the gas separating space so that they condense and are returned with the liquid components of the flow to the heating compartment. Upon rising within the relatively cooler zone at the upper end of the flume, portions of the gas will condense and drop back into the liquids for discharge therewith into the settling compartment. It is thus obvious that treatment of the evolved gas within the flume prevents the evolved gas from interfering with settling of the oil in the settling compartment. It is also obvious that by controlling the temperatures and flow of the fluids, the oil product is stabilized since all of the gas hydrocarbon components that are liquefied at the operating temperature of the treater and all gaseous hydrocarbons which are gaseous at the operating temperature are separated and discharged without interference with the settling of the oil.

It is also obvious that the location of the water draw-off and gas discharge pipes within the interior of the treating vessel eliminates the possibility of any freeze-ups which might interfere with operation of the treater when the treater is used in cold climates.

What we claim and desire to secure by Letters Patent is:

1. An apparatus of the character described for treating a mixture containing free gas with an oil-water emulsion including a vessel having separate gas separating, settling, and heating compartments, means for passing the mixture into the separating compartment for separation of the free gas, a duct connecting the gas separating compartment with the heating compartment for passing the emulsion component into said heating compartment, a heater in said heating compartment for heating the emulsion, a flume having a lower end in connection with the settling compartment and extending vertically along the inner side of an exterior wall of the vessel to effect cooling of fluids in the flume and having a flow connection with the gas separating compartment at its upper end, a transfer duct connecting the heating compartment with said flume for conducting hot oil and water components of the emulsion from said heating compartment into said flume, valve means for controlling flow through the transfer duct, said flow connection at the upper end of the flume providing a vapor outlet into an upper portion of the gas separating compartment for discharging vapors evolved in said heating compartment which are not condensed in the flume, means for discharging water from said heating compartment, means for removing gas from the gas separating compartment, means for passing water from said settling compartment into the heating compartment, and means for removing settled oil from the settling compartment.

2. An apparatus for treating a mixture containing free gas with an oil-water emulsion including a vertically elongated vessel, an upper partition extending transversely within the vessel and forming a bottom of an upper gas separating compartment and the top of a lower settling compartment in said vessel, a lower partition extending transversely within the vessel and forming the bottom of the settling compartment and top of a heating compartment in said vessel, means for passing the mixture to be treated into the gas separating compartment for separation of the free gas from the oil-water emulsion, a duct connecting the gas separating compartment with a lower portion of the heating compartment for passing the separated oil-water emulsion into said heating compartment, a heater in the heating compartment for heating the oil-water emulsion, a flume extending vertically along the inner side of an exterior wall of the vessel and having a lower end in connection with the settling compartment and an upper end in connection with the gas separating compartment, a side of said flume being in heat exchange with said exterior wall of the vessel to effect cooling of the flume responsive to temperature exteriorly of the vessel, a transfer duct on the outer side of the vessel and connecting an upper portion of the heating compartment with said flume for conducting hot oil and water components of the emulsion and evolved vapors from the heating compartment into said flume for flow of the oil and the water downwardly of the flume into the settling compartment wherein the oil collects on top of the water, a valve in the transfer duct for controlling flow therethrough, said flow connection at the upper end of said flume comprising a duct terminating within an upper portion of the gas separating compartment for discharging vapors which do not condense in the flume into the separated gas, means for discharging free water from the lower portion of the heating compartment, means for removing separated gas from the upper portion of the gas separating compartment, means for passing water from the settling compartment into the heating compartment for removal with the free water, and means for removing settled oil from the upper portion of the settling compartment.

3. An apparatus as described in claim 2 wherein said transfer duct has a plurality of connections with said flume for conducting the hot oil and water components of the emulsion from said heating compartment into the flume at various levels to control temperature of the fluids in the flume.

4. An apparatus for treating a mixture containing free gas with an oil-water emulsion including a vertically elongated vessel, an upper partition extending transversely within the vessel and forming a bottom of an upper gas separating compartment and the top of a lower settling compartment in said vessel, a lower partition extending transversely within the vessel and forming the bottom of the settling compartment and top of a heating compartment in said vessel, means for passing the mixture to be treated into the gas separating compartment for separation of the free gas from the oil-water emulsion, a duct connecting the gas separating compartment with a lower portion of the heating compartment for passing the separated oil-water emulsion into said heating compartment, a heater in the heating compartment for heating the oil-water emulsion, a flume extending vertically along the inner side of an exterior wall of the vessel and having a lower end in connection with the settling compartment and an upper end in connection with the gas separating compartment, a side of said flume being in heat exchange with said exterior wall of the vessel to effect cooling of the flume responsive to temperature exteriorly of the vessel, a transfer duct on the outer side of the vessel and connected with an upper portion of the heating compartment and said transfer duct having a plurality of connections with said flume for conducting hot oil and water components of the emulsion and evolved vapors from the heating compartment into said flume at various levels to control temperature of the fluids in the flume, valves in the transfer duct connections for controlling admission through said respective connections, said connection at the lower end of the flume providing for flow of the oil and water into the settling compartment wherein the oil collects on top of the water, said flow connection at the upper end of said flume comprising a duct terminating within an upper portion of the gas separating compartment for discharging vapors which do not condense in the flume into the separated gas, means for discharging free water from the lower portion of the heating compartment, means for removing separated gas from the upper portion of the gas separating compartment, means for passing water from the settling compartment into the heating compartment for removal with the free water, and means for removing settled oil from the upper portion of the settling compartment.

5. An apparatus of the character described for treating a mixture containing free gas with an oil-water emulsion including a vessel having separate gas separating, settling, and heating compartments, means for passing the mixture into the separating compartment for separation of the free gas, a duct connecting the gas separating compartment with the heating compartment for passing the emulsion component into said heating compartment, a heater in said heating compartment for heating the emulsion, a flume having a lower end in connection with the settling compartment and extending vertically along the inner side of an exterior wall of the vessel to effect cooling of fluids in the flume and having a flow connection with the gas separating compartment at its upper end, a transfer duct connected with an upper portion of the heating compartment and having a plurality of connections with the flume for conducting the hot oil and water components of the emulsion and evolved vapors into the flume at various levels to control temperature of said fluids in the flume, valves in said transfer duct connections with the flume for controlling admission through the respective ducts, said flow connection at the upper end of the flume providing a vapor outlet into an upper portion of the gas separating compartment for discharging vapors evolved in said heating compartment which are not condensed in the flume, means for discharging water from said heating compartment, means for removing gas from the gas separating compartment, means for passing water from said settling compartment into the heating compartment, and means for removing settled oil from the settling compartment.

6. An apparatus of the character described for treating a mixture containing free gas with an oil-water emulsion including a vessel having separate gas separating, settling, and heating compartments, means for passing the mixture into the separating compartment for separation of the free gas, a duct connecting the gas separating compartment with the heating compartment for passing the emulsion component into said heating compartment, a heater in said heating compartment for heating the emulsion, a flume having a lower end in connection with the settling compartment and extending vertically along the inner side of an exterior wall of the vessel to effect cooling of fluids in the flume and having a flow connection with the gas separating compartment at its upper end, a transfer duct connecting the heating compartment with said flume for conducting hot oil and water components of the emulsion from said heating compartment into said flume, said transfer duct being located exteriorly of the vessel, said flow connection at the upper end of the flume providing a vapor outlet into an upper portion of the gas separating compartment for discharging vapors evolved in said heating compartment which are not condensed in the flume, means for discharging water from said heating compartment, means for removing gas from the gas separating compartment, means for passing water from said settling compartment into the heating compartment, and means for removing settled oil from the settling compartment.

CHARLES W. HAYES.
VERNON G. MARTIN.

REFERENCES CITED

The following references are of record in the file of this patent:

UNITED STATES PATENTS

| Number | Name | Date |
|---|---|---|
| 2,232,948 | Ihrig et al. | Feb. 25, 1941 |
| 2,546,269 | Lovelady | Mar. 27, 1951 |